United States Patent [19]

Baar et al.

[11] Patent Number: 5,669,688
[45] Date of Patent: Sep. 23, 1997

[54] DISPLAY PANEL PROJECTOR AND METHOD OF USING SAME

[75] Inventors: Kenneth W. Baar, Escondido; Sidney Sitachitt, San Diego; Barry K. Spicer, Ramona; Graham H. Brewis, Oceanside; Arthur P. Minich, San Diego; Paul R. Corsaro, Escinitas; Paula M. Berg, San Diego, all of Calif.

[73] Assignee: Proxima Corporation, San Diego, Calif.

[21] Appl. No.: 655,208

[22] Filed: Jun. 7, 1996

[51] Int. Cl.⁶ ................................................. G03B 21/14
[52] U.S. Cl. ................................................. 353/119
[58] Field of Search ................................ 353/119, DIG. 3

[56] References Cited

U.S. PATENT DOCUMENTS

| | | | |
|---|---|---|---|
| 4,379,628 | 4/1983 | Graef | 353/119 |
| 5,090,800 | 2/1992 | Ushiro | 353/119 |
| 5,325,137 | 6/1994 | Konuo et al. | 353/122 |
| 5,343,262 | 8/1994 | Park | 353/119 |
| 5,400,095 | 3/1995 | Minich et al. | 353/122 |

*Primary Examiner*—William Dowling
*Attorney, Agent, or Firm*—Bernard L. Kleinke; Peter P. Scott

[57] ABSTRACT

A projector and a method of using it includes an expandable housing, which includes a display panel assembly, and an illumination and display panel projection optics arrangement. The housing includes housing portions which are movably mounted relative to one another, to increase the overall dimensions of the housing adjustably to accommodate the display panel optics arrangement during use as a projector.

22 Claims, 13 Drawing Sheets

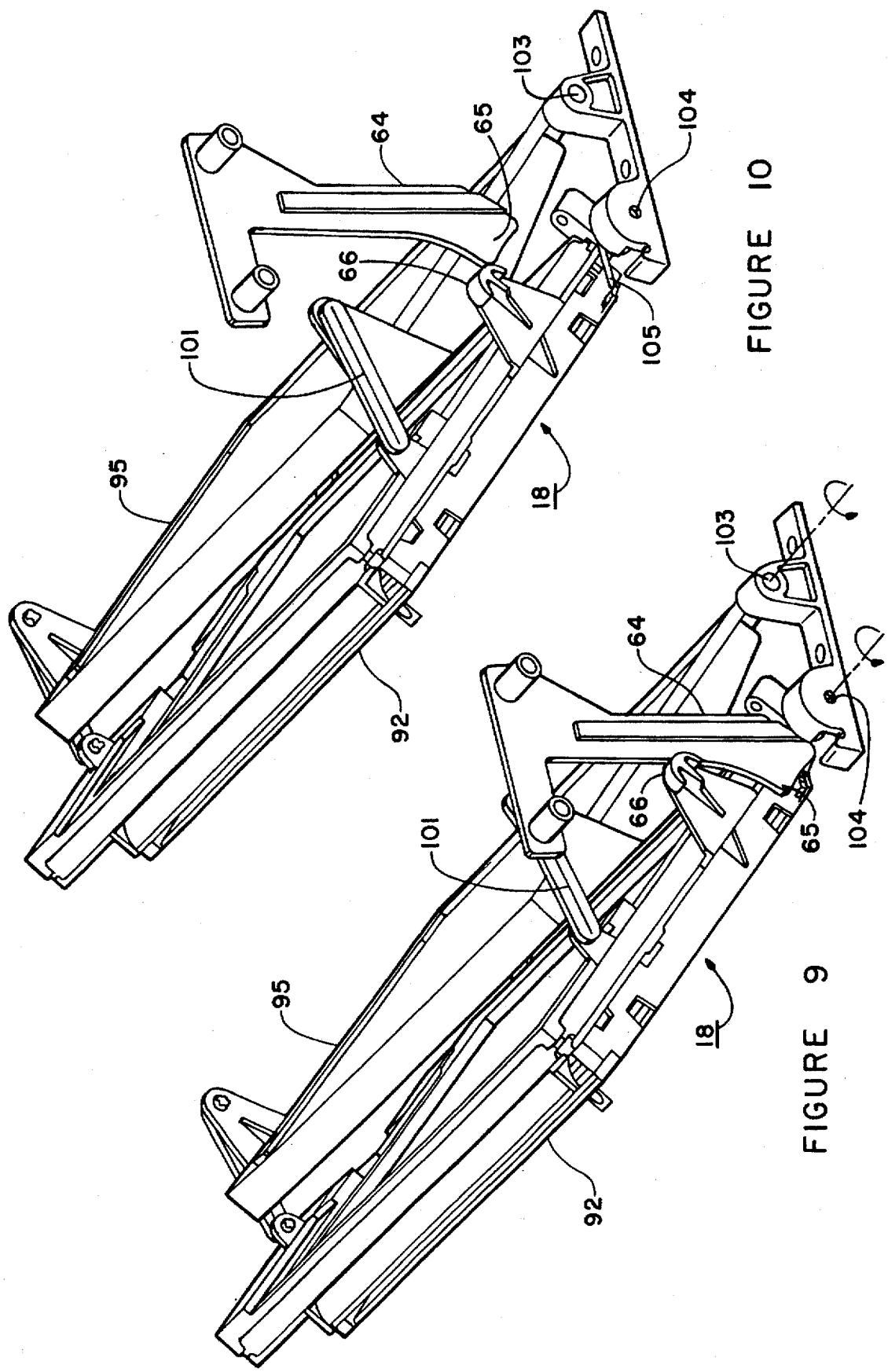

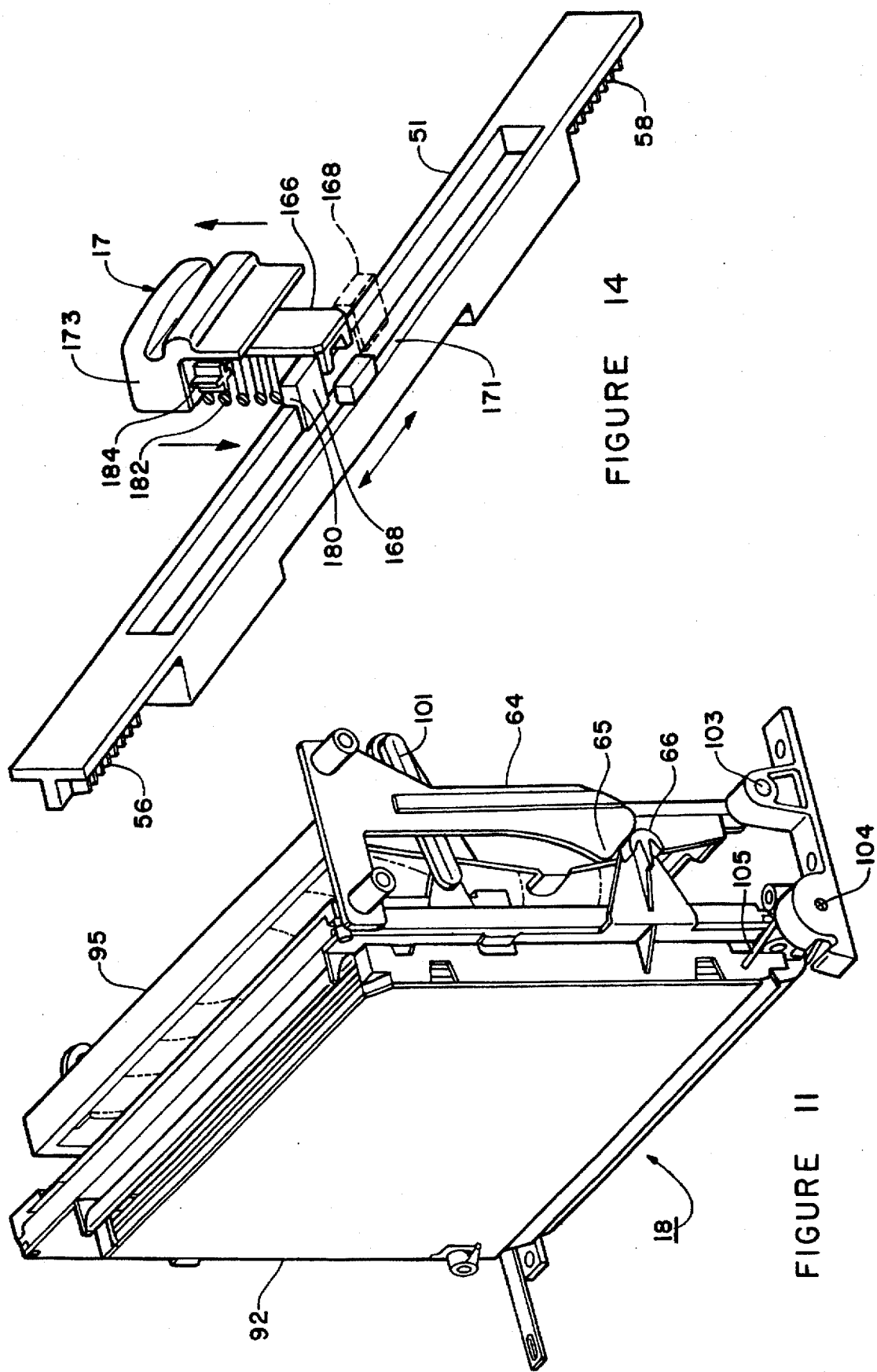

DISPLAY PANEL PROJECTOR AND METHOD OF USING SAME

CROSS-REFERENCE TO RELATED APPLICATIONS

This patent application is related to copending U.S. design patent application, entitled "INTEGRATED LIQUID CRYSTAL DISPLAY PROJECTOR", and to U.S. patent applications entitled "PROJECTION LENS ARRANGEMENT AND METHOD OF USING SAME", "IMAGE DISPLAY STABILIZATION APPARATUS AND METHOD".

TECHNICAL FIELD

The present invention relates to compact display panel projectors and methods of using them. More particularly, the invention relates to a projector, which includes a display device, such as a livid crystal display (LCD) panel, which may be driven by a computer, a video cassette recorder, live television cable signals, or the like, and which includes illumination and projection optics for projecting the image from the livid crystal display panel onto a remote viewing surface, such as a screen.

BACKGROUND ART

Livid crystal display projection equipment has been used in meeting or conference rooms to project enlarged images onto a screen or other viewing surface. In this manner, computer generated images can readily be viewed by a group of people in the same room.

Initially, the projection apparatus was in the form of a large LCD panel, which was adapted to be positioned on the stage of an overhead projector so that the image on the display panel could be projected onto the viewing surface. In this manner, the user could readily prepare a presentation on his or her personal computer, and then the computer would be used to drive the LCD panel for projection purposes.

In order to eliminate the need for a separate overhead projector, integrated projectors have been employed, wherein the LCD panel is mounted within the projector, which includes illumination and projection optics for projecting the desired computer generated image. Such a unit is self contained and easy to use.

In order to make such an integrated projector more readily transportable, a small sized unit has been designed, and successfully marketed. Reference may be made to U.S. Pat. Nos. 5,321,450; 5,400,095 and 5,453,803, which are each incorporated herein by reference. In the foregoing mentioned patents, there is disclosed an integrated projector which includes a folded light path for the projection optics system. By folding the light path with the use of mirrors, the overall size of the unit is small and compact, and thus readily transportable by the user.

It would be highly desirable to have a new and improved integrated projector, which is even smaller in size and more compact so that it can be even more conveniently carried during travel. It is desirable to have such a unit which is so small and compact that it can fit into a brief case or other such small carrying device.

It is also desirable to have such a reduced size projector, without folding the light path with mirrors, since the mirrors not only can add expense, but also can cause the loss of some light, thereby resulting in corresponding loss in efficiency and image brightness. Therefore, it is highly desirable to substantially reduce the size of the projector without folding the optic light path by the use of mirrors or other such elements, and thereby provide an even brighter image.

Moreover, when greatly reducing the size of the projector, it is difficult to illuminate uniformly the LCD panel, and thus a less than desirable image can result. Also, the short optical path, without being folded by mirrors, can result in a less than desirable focusing of the light and the image to be projected. As a result, the projected image can have unwanted and undesired distortion.

DISCLOSURE OF INVENTION

Therefore, the principal object of the present invention is to provide a new and improved display panel projector, which is smaller in size and thus more compact in size to facilitate its portability.

Another object of the present invention is to provide such a new and improved projector and a method of using it, wherein such a projector can produce a bright image, with little or no distortion over a substantial throw range.

Briefly, the above and further objects of the present invention are realized by providing a small and compact LCD display projector and a method of using it, wherein the projector does not require a folded optics light path and yet is able to provide a projected image with little or no distortion.

A projector and a method of using it includes an expandable housing, which includes a display panel assembly, and an illumination and display panel projection optics arrangement. The housing includes housing portions which are movably mounted relative to one another. The housing portions can be positionally adjusted relative to one another to increase the overall dimensions of the housing to accommodate the positioning of the display panel optics arrangement during use as a projector.

In one form of the invention, a mechanism helps move the display panel assembly between an inclined storage position when the housing is small and compact, and an upright use position interposed between a light source and a projection lens arrangement without the requirement of a folded optics light path.

When the inventive projector is disposed in its closed position occupying reduced dimensions, the projector is convenient to be carried and to be stored. When it is adjusted to assume a configuration with increased dimensions, the optical path for the illumination and projection optics arrangement is permitted to occupy a larger space. Thus, the resulting projected image possesses little or no distortion, as compared to a similar optics arrangement mounted within a substantially smaller space. The substantially distortionless image is produced by a very small sized projector without folding the light path with expensive and inefficient mirrors.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 9 is an enlarged pictorial view of the LCD panel assembly of the projector of FIG. 1, illustrated the assembly in an inclined storage position;

FIG. 10 is an enlarged pictorial view similar to FIG. 9 and illustrates the LCD panel assembly moving toward an upright position as the projector is moving to its opened position;

FIG. 11 is a view of the LCD panel assembly, similar to FIG. 9, illustrating it in its upright use position with the projector disposed in its opened position;

FIG. 14 is an enlarged pictorial view of one of the release button assemblies and its link mechanism rack for the projector of FIG. 1;

BEST MODE FOR CARRYING OUT THE INVENTION

Figure 1:
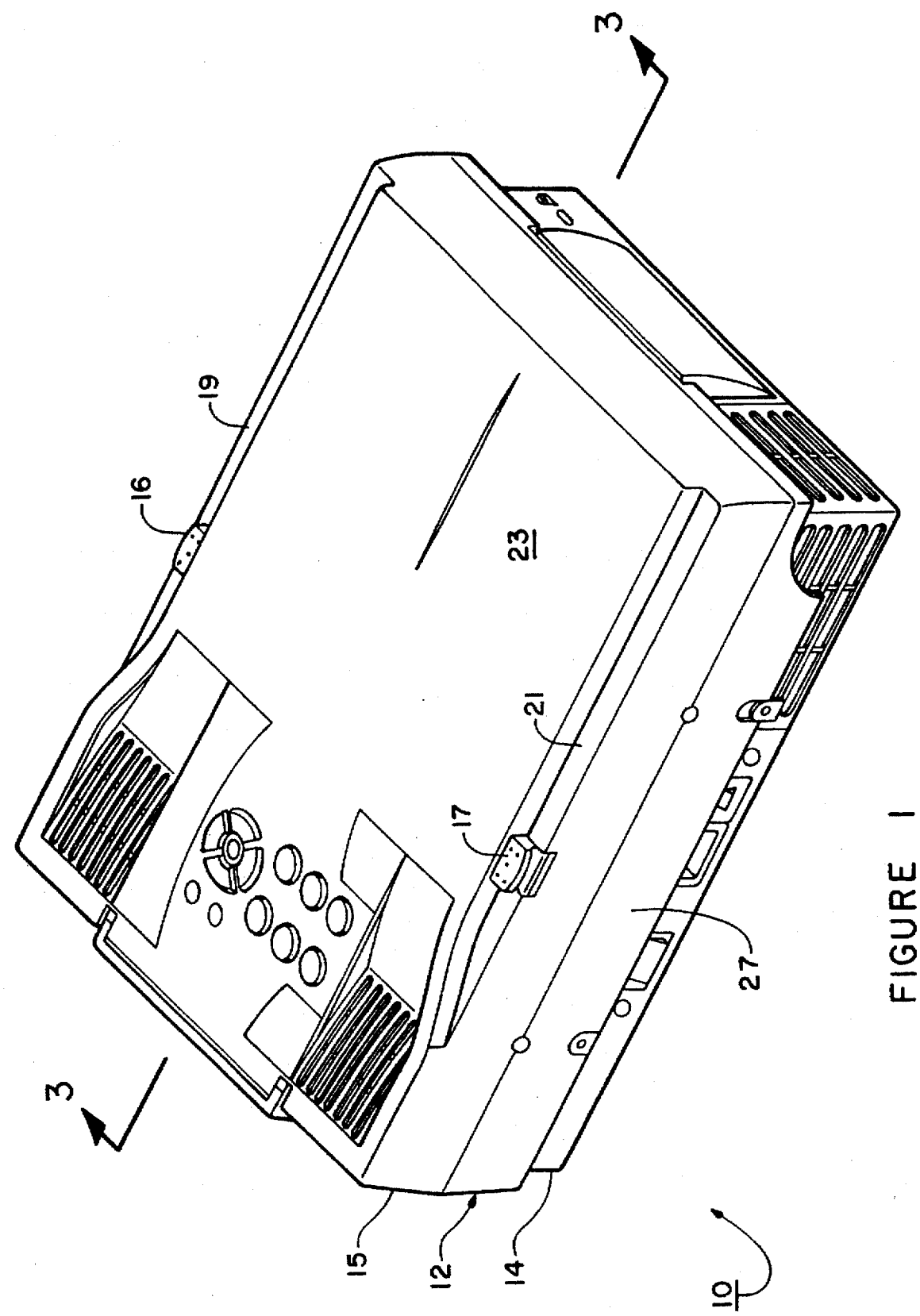
FIG. 1 is a pictorial view of a projector, which is constructed in accordance with the present invention.
Figure 2:
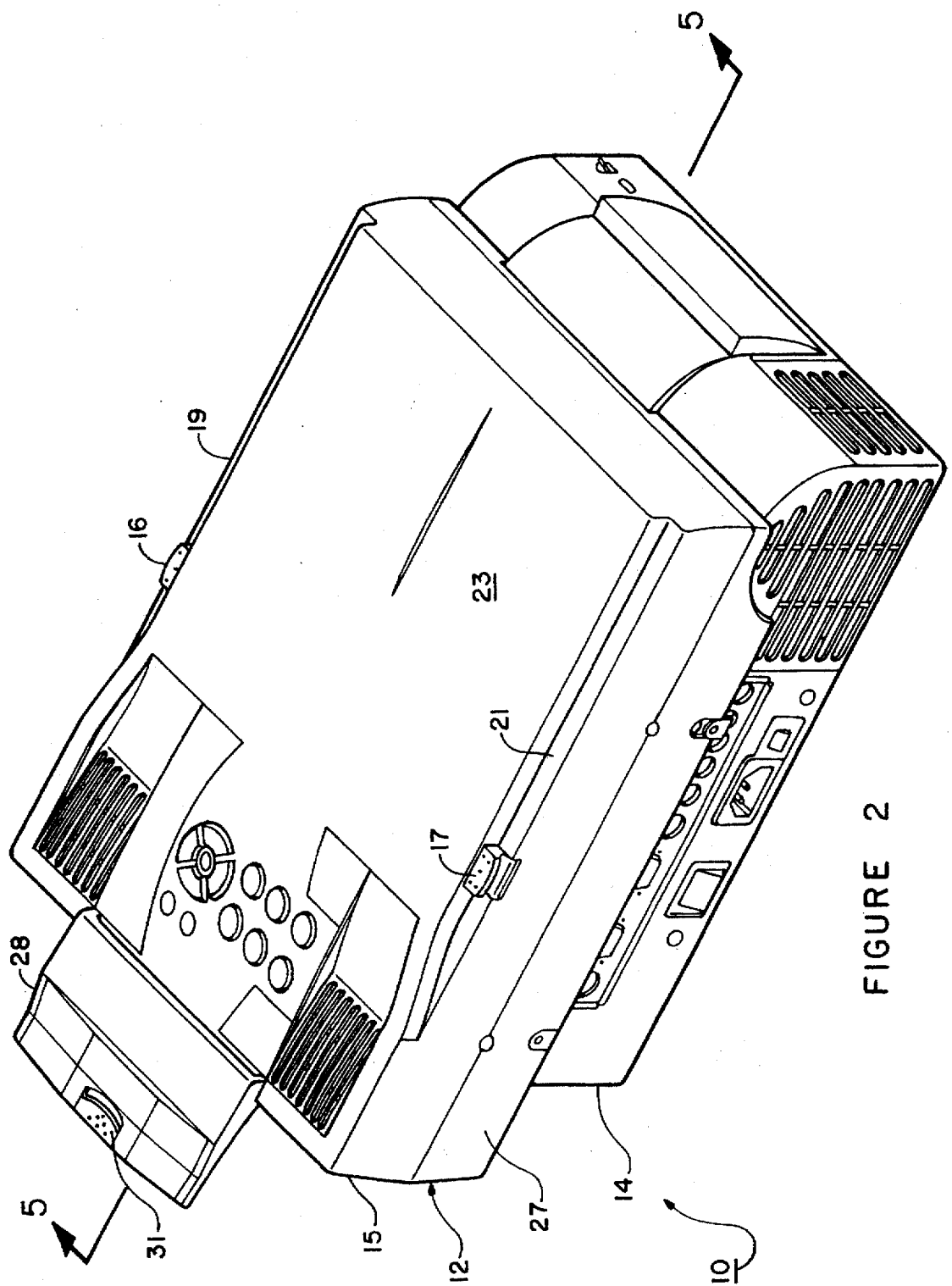
FIG. 2 is a pictorial view of the projector of FIG. 1, illustrating it in an opened or use position.
Figure 6:
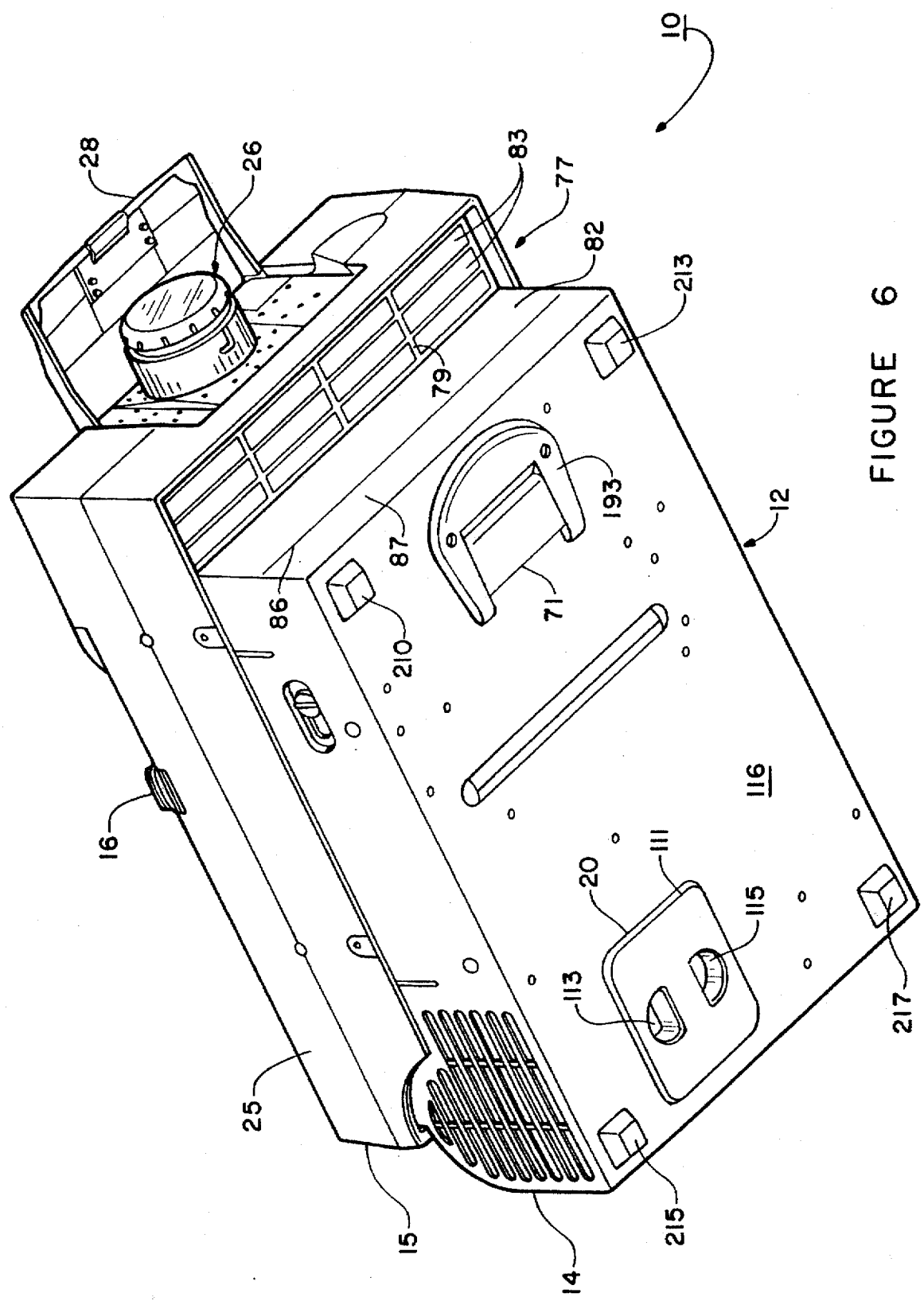
FIG. 6 is a pictorial view of the opened projector of FIG. 2 from a bottom, front and right side prospective.

Referring now to the drawings, and more particularly to FIGS. 1, 2 and 6, there is shown a display panel projector 10, which is constructed in accordance with the present invention. A projector 10 is adapted to be used with a computer (not shown) or other device, such as a video recorder (not shown) for projecting an image onto a remotely located viewing surface, such as a screen (not shown).

The projector 10 generally comprises a housing 12 having a lower housing portion 14 adapted to be resting on a supporting surface, and an upper housing portion 15 disposed thereabove. A pair of release buttons 16 and 17 are mounted on opposite sides within a pair of recessed areas at 19 and 21, respectively, at the outside corner edges formed between a top wall 23 and a pair of side walls 25 and 27. As hereinafter described in greater detail, when the user depresses both of the release buttons 16 and 17, the upper housing portion 15 is urged resiliently away from the lower housing portion 14, whereby the user can then move the upper housing portion upwardly and frontwardly into an opened or use position as indicated in FIG. 2. The operation can be reversed to close the housing into its more compact closed position as indicated in FIG. 1 to assume a very compact configuration for storage and travel purposes.

Figure 3:
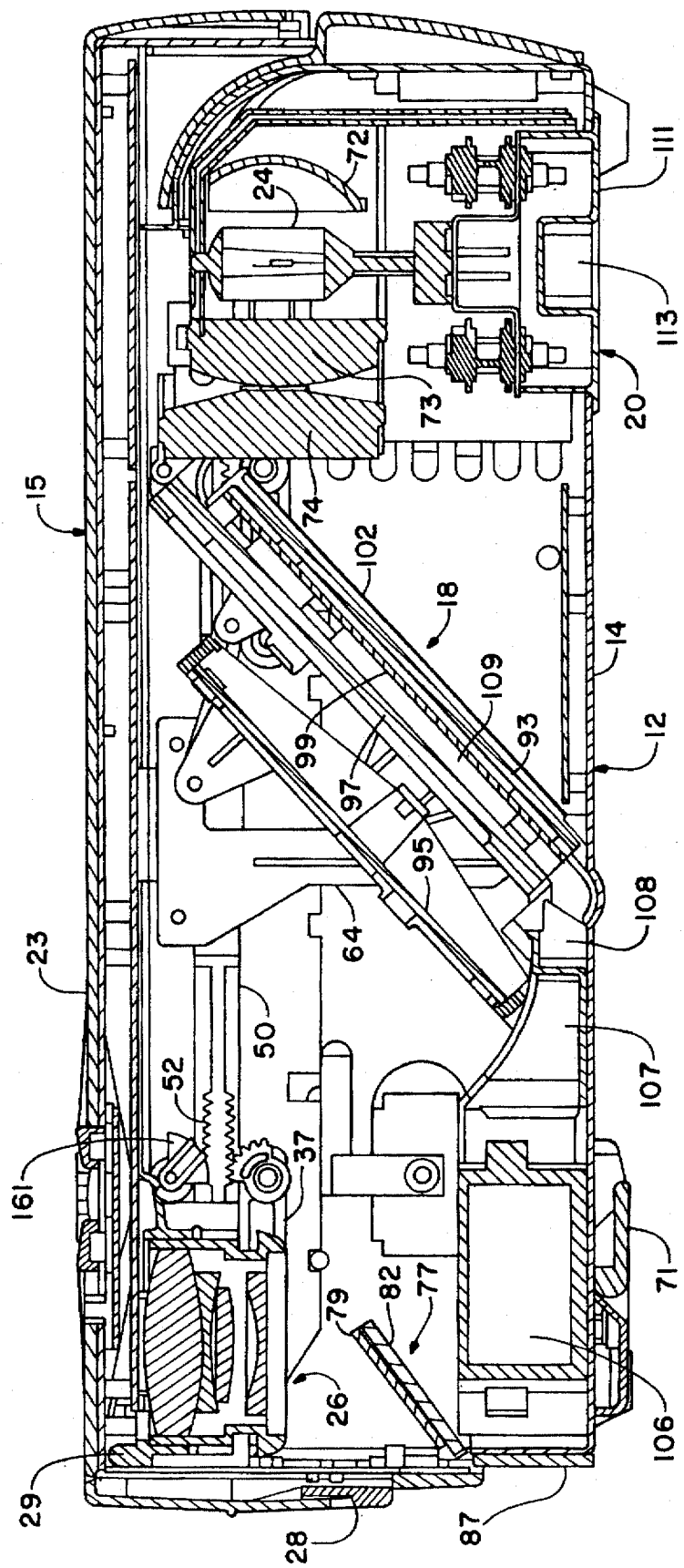
FIG. 3 is a sectional view of the projector of FIG. 1 taken substantially on line 3—3 thereof.
Figure 4:
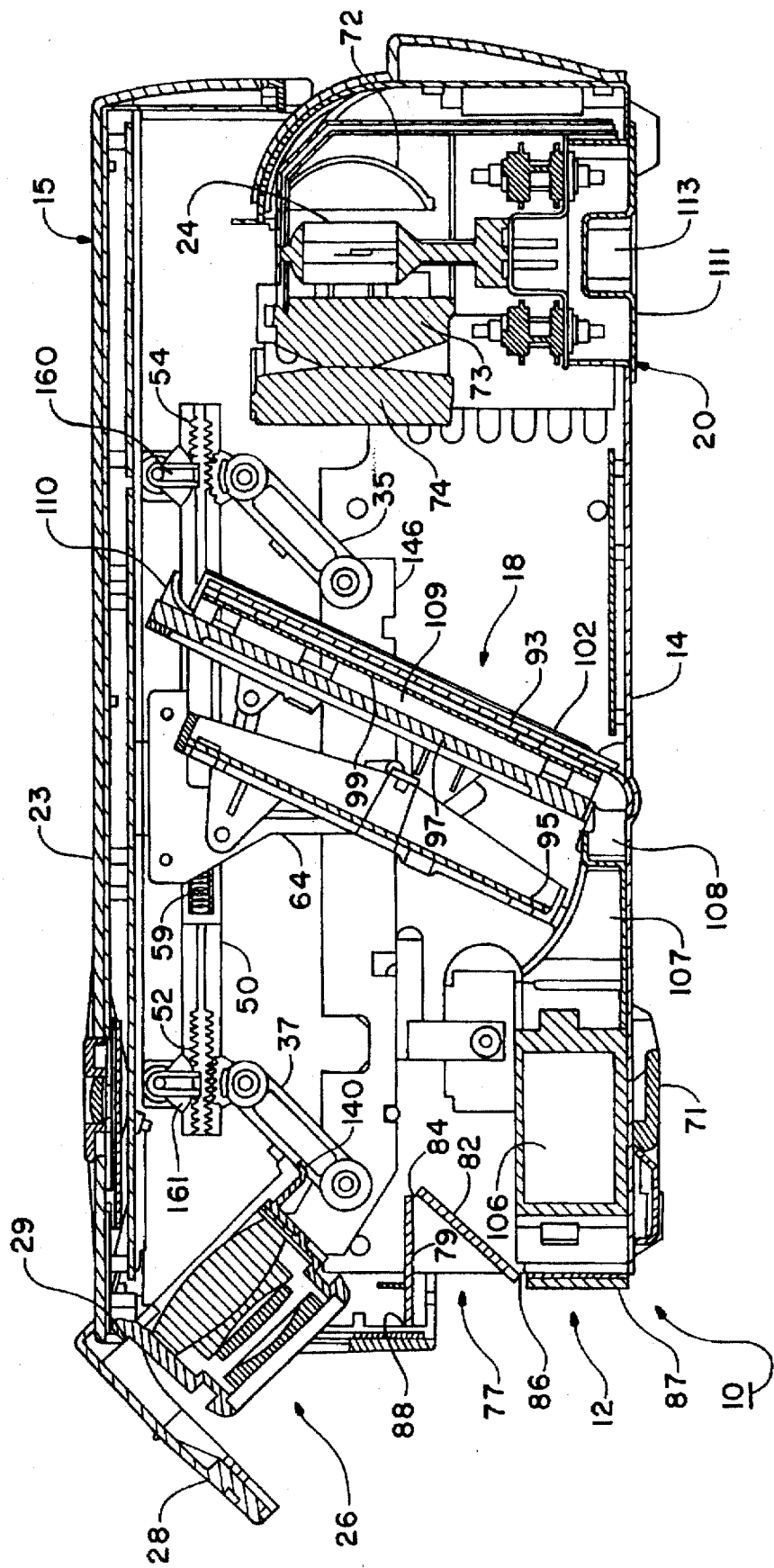
FIG. 4 is a cross-sectional view of the projector of FIG. 1, similar to FIG. 3, illustrating the projector in the process of moving toward its opened position.
Figure 5:
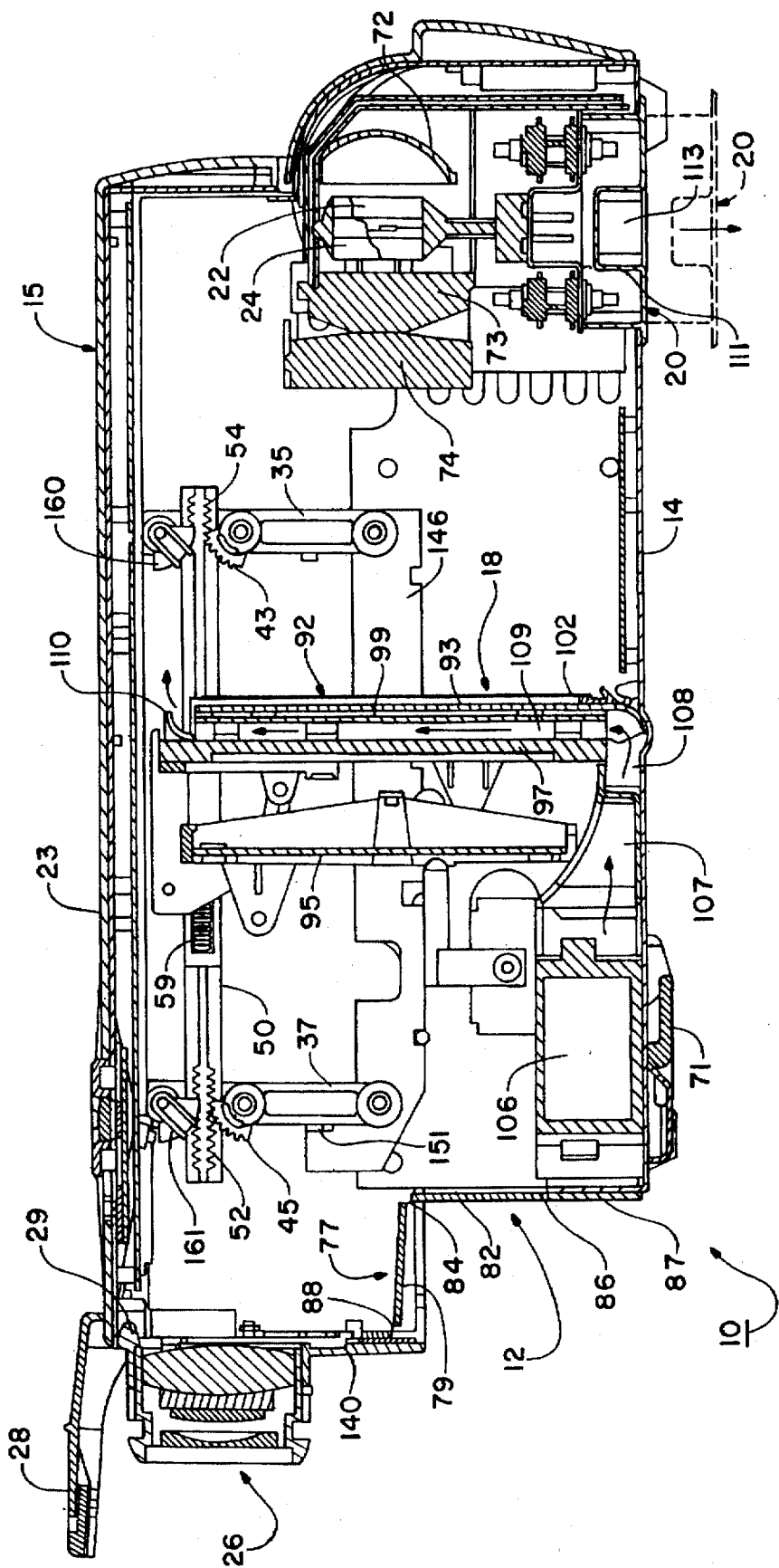
FIG. 5 is a sectional view of FIG. 2 taken substantially on line 5—5 thereof, illustrating the lamp assembly being removable as indicated in broken lines.

As indicated in FIGS. 3, 4, 5, 9, 10 and 11, a liquid crystal display (LCD) assembly 18 is positioned within the housing 12 in a rearwardly inclined position when the housing is in its closed or storage position as indicated in FIG. 1. The LCD assembly 18 is utilized to create an image to be displayed in a manner as described more fully in connection with the above-identified patents and patent applications. When the upper housing portion 15 is deployed relative to the lower housing portion 14, the LCD assembly 18 moves pivotally from its inclined position forwardly until it assumes a generally vertical upright position as indicated in FIGS. 5 and 11. In this position, a movable lamp assembly 20 having an active lamp 22 (FIG. 5) and a spare lamp 24, illuminates the LCD assembly 18 from its rear side. The illuminated assembly 18 then directs the image along an off-axis path toward a front mounted projection lens arrangement 26.

The optical arrangement 26, together with the complete optical path including the LCD assembly 18 is described in greater detail in the co-pending above-identified patent application, entitled "PROJECTION LENS ARRANGEMENT AND METHOD OF USING SAME."

The projection lens arrangement 26 is normally stowed within the housing 12 in a depending vertical position as indicated in FIG. 3. Once the housing is moved to its deployed or opened position as indicated in FIG. 5, a lens access door 28 is released by sliding a door latch 31 (FIG. 2) and swung forwardly about a top horizontal axis into a generally horizontal position as indicated in FIGS. 2, 5 and 6. A spring (not shown) urges the pivotally mounted lens arrangement 26 to swing or pivot about a pivot point 29 at the front portion of the top wall 23 into its horizontal disposition as indicated in FIG. 5.

In the use position as indicated in FIG. 5, the lamp 24 is aligned along a common axis with the LCD assembly 18. The axis of the projection lens arrangement 26 is disposed in an offset or spaced-apart parallel manner relative to the axis of the LCD assembly 18 and the lamp 24 to provide an off-axis arrangement. In this arrangement, the elements are all optically centered, but mechanically disposed in an off-axis manner to enable the image to be projected from the projection lens arrangement 26 upwardly onto the viewing surface (not shown) above the projection lens arrangement 26.

The advantages of an off-axis arrangement include the ability to project the image in a preferred manner above the level of the projector 10 with little or no keystone distortion. In this manner, such a small size, compact projector 10 can readily be used on a table or desk. In this regard, the off-axis arrangement avoids the requirement of positioning the projector in an elevated location, such as suspending it from the ceiling, to correct for keystone distortion. This optical arrangement is more fully described in the above-identified co-pending patent application.

Figure 7:
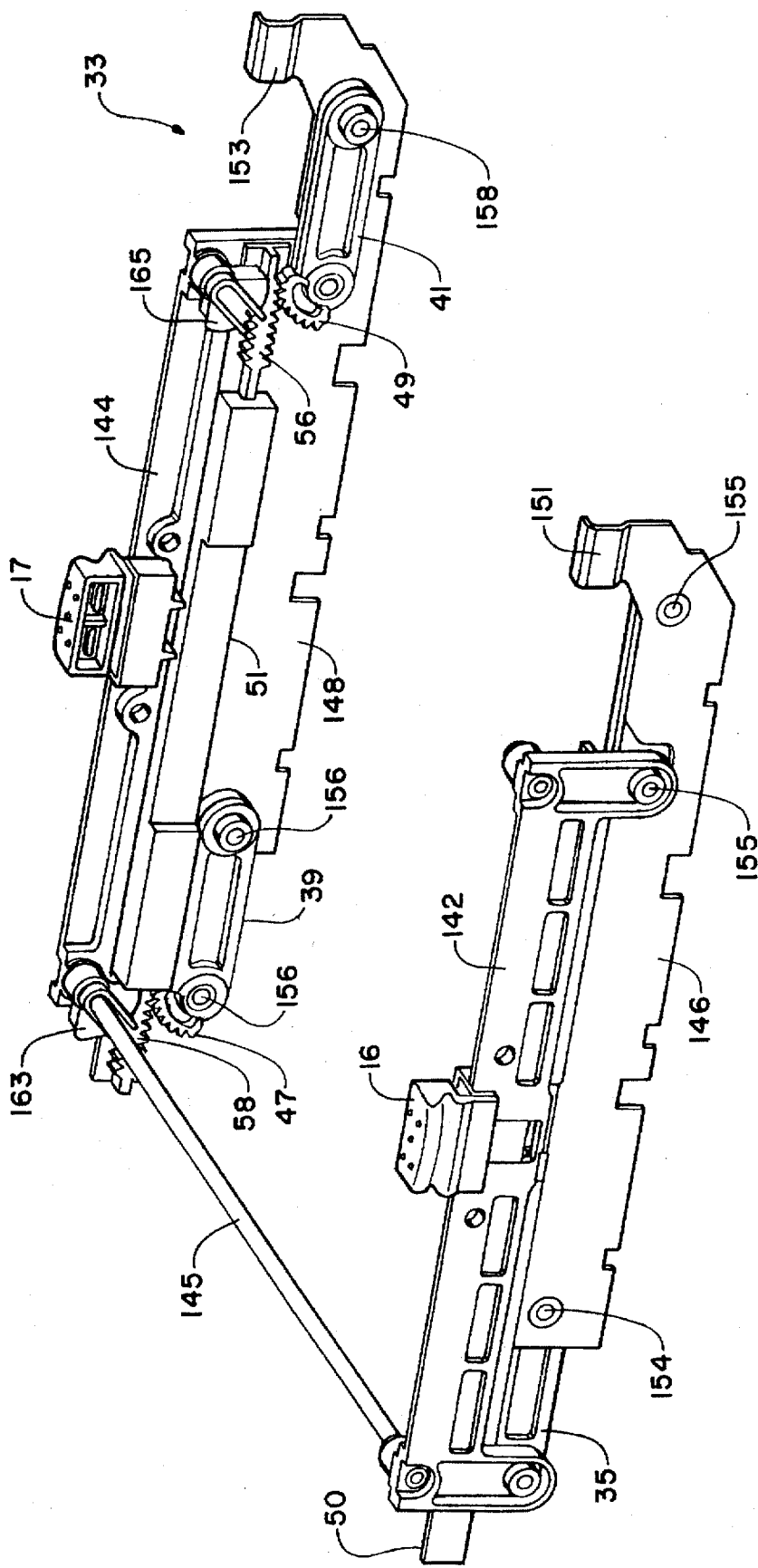
FIG. 7 is a fragmentary pictorial view of the four-bar linkage mechanism, for the projector of FIG. 1, shown to an enlarged scale.
Figure 8:
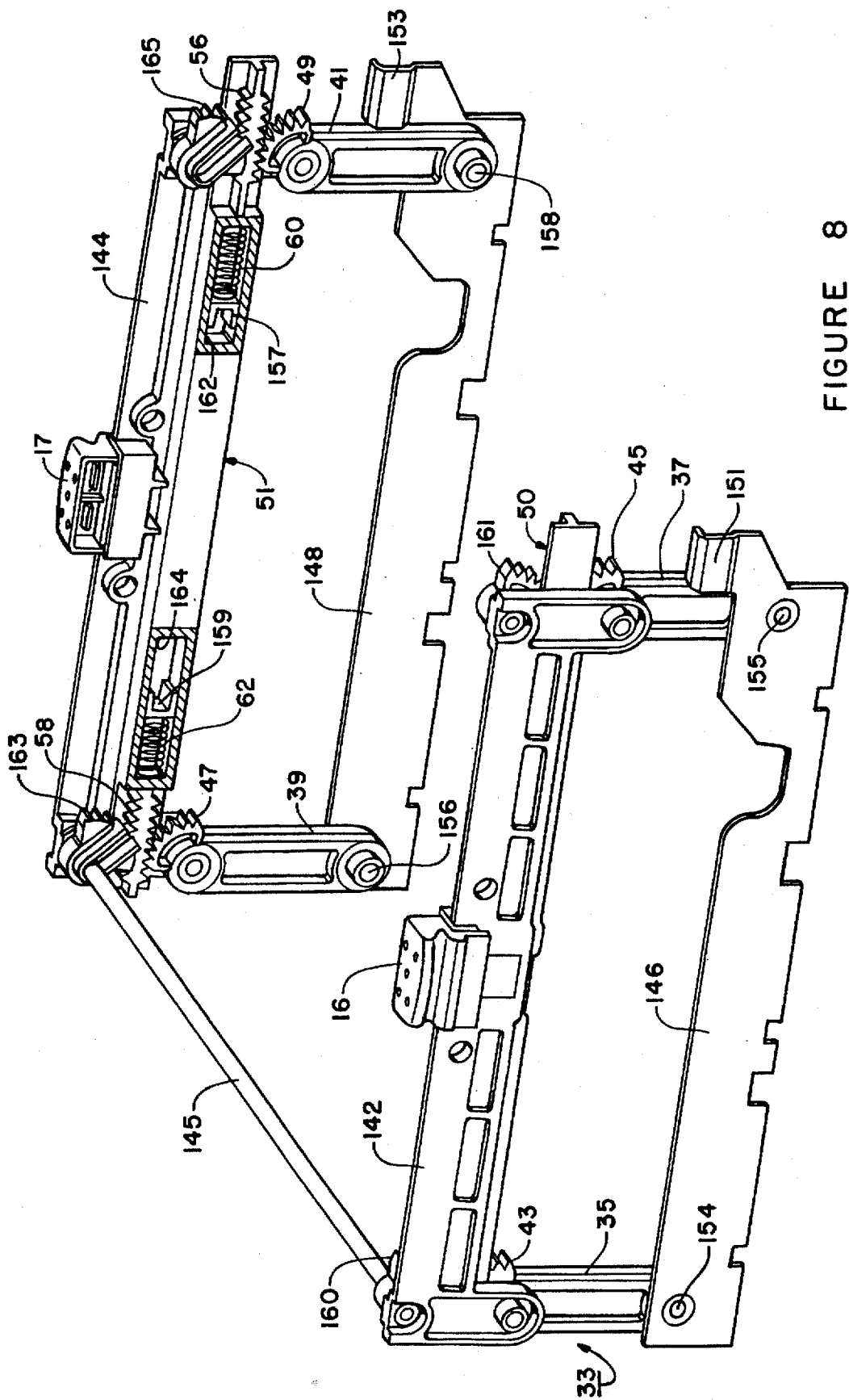
FIG. 8 is a fragmentary pictorial view of the mechanism of FIG. 7, illustrating it in its projector opened position.

Referring now to FIGS. 7 and 8, there is shown a four bar linkage mechanism generally indicated at 33 for facilitating the upward and forward motion of the upper housing portion 15 relative to the lower housing portion 14 when the release buttons 16 and 17 are depressed by the user to cause the housing to be adjusted, with the help of the user, to its opened or used position. The mechanism 33 includes a pair of spaced apart right links 35 and 37 and a pair of left links 39 and 41, which are pivotally mounted between the upper and lower housing portions 15 and 14. A pair of right pinion gear sections 43 and 45 are attached to the upper ends of the links 35 and 37 respectively. Similarly, a pair of left pinion gear sections 47 and 49 are connected to the upper ends of the links 39 and 41, respectively, as indicated in FIG. 8.

The right pinion sections 43 and 45 mesh with a longitudinally extending right rack 50, and the left pinion sections 45 and 47 mesh with a longitudinally extending left rack 51. As shown in FIG. 5, the rack 50 includes a set of front rack teeth 52 for meshing with the pinion section 35. Similarly, the rack 50 includes rear rack teeth 54 for meshing with the pinion section 43. Similarly, the left rack 51 includes a pair of front rack teeth 56 for meshing with the front pinion section 49. The rear rack teeth 58 (FIG. 8) at the rear of the left rack 51 mesh with the pinion section 47.

In order to cause the upper housing portion 15 to be urged resiliently away from the lower housing portion 15, a right deploy spring 59 (FIG. 5) in the right rack 50 and right deploy spring 60 (FIG. 8) in the left rack 51 are normally compressed when the housing is closed, and when the release buttons 16 and 18 are depressed, the deploy springs urge both racks 50 and 51 forwardly horizontally relative to the lower housing portion 14, thereby causing the links 33, 35, 37 and 39 to swing from their generally horizontal disposition in the closed position, upwardly and forwardly into a vertical position as indicated in FIG. 8. In this regard, as the right and left racks 50 and 51 move forwardly in a parallel spaced-apart manner, the pinion sections are driven in such a manner to cause them to drive the links to swing upwardly and forwardly into the deployed position as indicated in FIG. 8.

In order to reverse the action and move the upward housing portion 15 in a rearward and downward motion into its final stored or compact storage position, once the release buttons are depressed, a pair of stow springs 62 (See FIG. 8) resiliently urges the rack 51 in a rearward direction. In this regard, the racks 50 and 51 are then urged, by their stow springs and with the assistance of the user, to move the upper housing portion downwardly into its final resting position and is locked in position by a latch (not shown).

Considering now the LCD panel assembly 18 with reference to FIGS. 9, 10 and 11, the LCD assembly 18 is mounted pivotally in a rearwardly inclined position and spring-loaded to pivot into a vertical position. As indicated in FIG. 9, when the housing 12 is disposed in its stowed or storage position, a stationary cam member 64 is affixed to the left inside of the upper housing portion 15, engages a cam follower 66 mounted on the LCD assembly 18 to hold the assembly 18 in the downward position.

As the upper housing portion 15 swings upwardly and forwardly into its deployed or use position, the LCD assembly 18 swings from its rearwardly inclined position as shown in FIG. 9 through an intermediate position as indicated in FIG. 10 and then into its final position as indicated in FIG. 11.

The forward traverse motion of the upper housing portion 15 relative to the lower housing portion 14 caused the overall effective length of the housing 12 to be increased when disposed in its opened position. In this manner, the optical path is sufficiently long for achieving a projected image with little or no distortion, without the requirement of folding the optical path by the use of mirrors. Also, as a result of the inventive construction, the optical path is arranged in the desirable off-axis configuration, which reduces or eliminates keystone distortion.

When the housing 12 is disposed in its closed position, the overall length and height is reduced substantially. Thus, when the housing 12 is closed, the projector 10 is compact in size, and has a low profile. Hence, the projector 10 can be readily and conveniently stored or carried by the user during travel.

Figure 12:
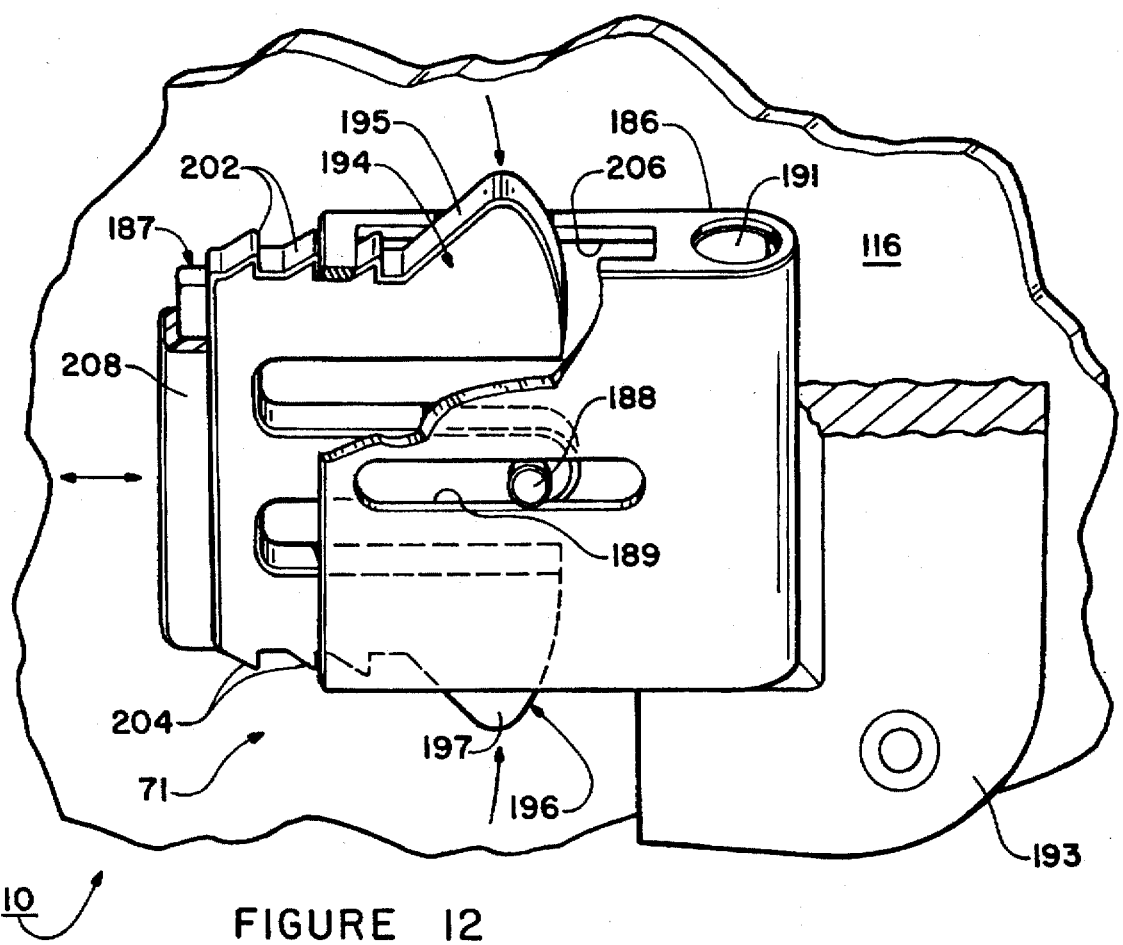
FIG. 12 is an enlarged fragmentary pictorial view of the foot device of the projector of FIG. 1.
Figure 13:
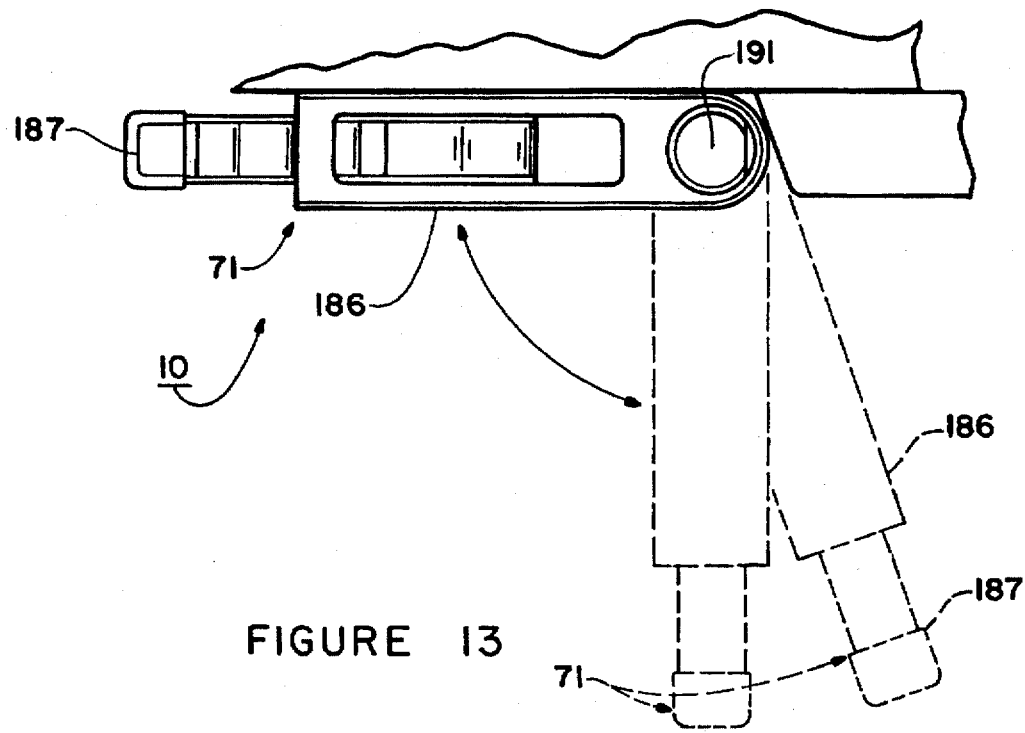
FIG. 13 is an elevational fragmentary view of the foot device of FIG. 12.

As shown in FIGS. 6, 12 and 13, an adjustable foot 71 is adapted to swing downwardly from a horizontal storage position into a depending position for raising the projector housing 12 at its front end portion to incline it upwardly to direct the image (not shown) a higher position on the viewing surface (not shown).

As hereinafter described in greater detail with reference to FIGS. 12 and 13, the foot 71 is adjustable in length and in its position to provide several incremental elevated positions with respect to a supporting surface for the projector 10. These multiple elevated positions allow adaptability and flexibility when different sized screens are used or larger groups of people need to see the image clearly from positions in the rear of a room.

Referring now to FIGS. 3, 4 and 5, there is shown a lamp reflector 72 to help correct and direct the light from the active lamp 22 (FIG. 5) forwardly through a pair of axially aligned condenser lenses 73 and 74 for directing the light onto the LCD assembly 18 when it is disposed in its use position as indicated in FIG. 5.

Figure 16:
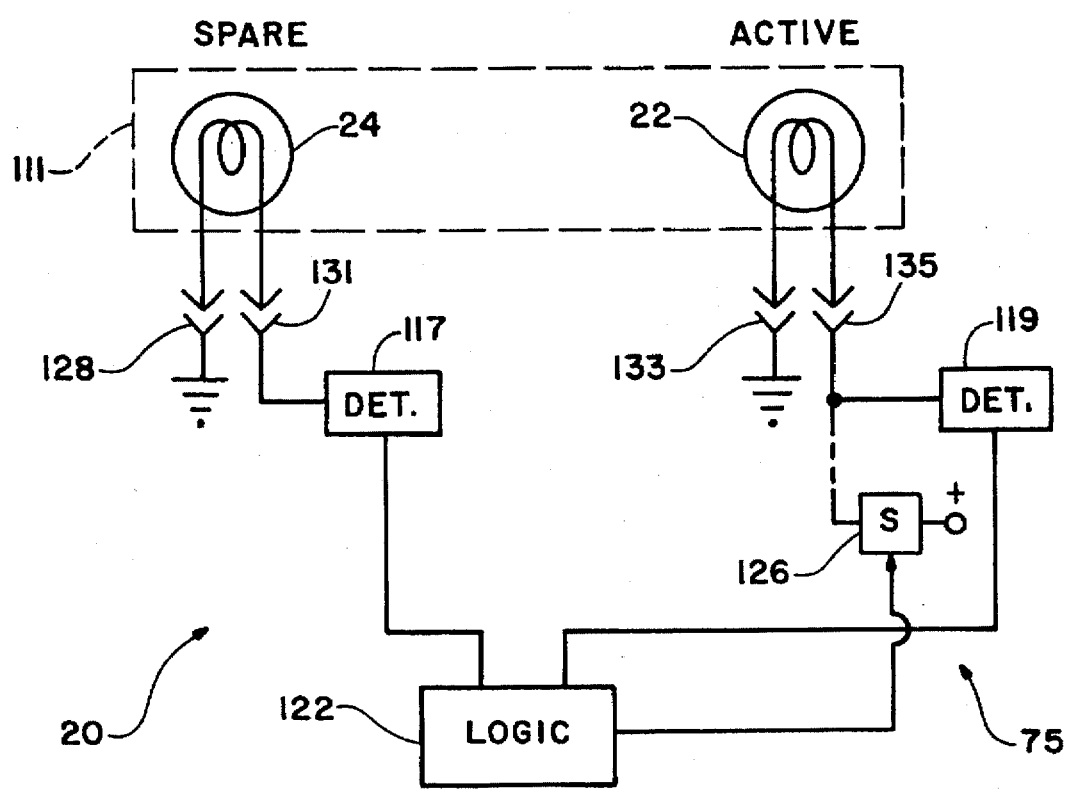
FIG. 16 is a circuit diagram for the lamp assembly for the projector of FIG. 1.

As shown in FIG. 16, a lamp detection circuit 75 of the removable lamp assembly 20 removes power from both of the lamps 22 and 24 when they both fail or the lamp assembly 20 is removed from the housing 12. In this manner, the voltage is removed from the circuit for safety purposes as hereinafter described in greater detail.

Considering now the housing 12 in greater detail with particular reference to FIGS. 3, 4, 5 and 6, the housing 12 includes a hinged sectional front wall 77 which facilitates a movement of the housing 12 from its compact reduced height and length configuration as shown in FIG. 3, through its deployed or use position as indicated in FIG. 5 with an increased overall length and height. The sectional front wall 77 includes an apertured panel 79 hingedly connected to an imperforate panel 82. An apertured panel 79 (FIG. 6) includes a plurality of rectangular vent openings 83 to facilitate the passage of air into the interior of the housing 12 for cooling purposes when the housing 12 is disposed in its use or deployed position as indicated in FIGS. 5 and 6.

The sectional front wall 77 is composed of suitable thermoplastic material and is connected together by living hinges. In this regard, a central living hinge 84 hingedly interconnects the panels 79 and 82. A lower living hinge 86 hingedly interconnects the lower portion of the imperforate panel 82 and a vertical finish panel 87. An upper living hinge 88 interconnects hingedly an upper forward end of the perforated or apertured panel 79 to a vertical panel 89.

In use, when the housing 12 is disposed in its stowed position as indicated in FIG. 3, the panels 79 and 82 are disposed in a generally overlapping position extending upwardly in an inclined position within the closed housing 12. As the housing is moved into its use position, as indicated in FIG. 4, the panels 79 and 82 open angularly relative to one another with the apertured panel 79 being disposed generally horizontally, and the imperforate panel 82 is disposed angularly downwardly from the apertured panel 79.

Once the housing 12 assumes its deployed or use position, the panels 79 and 82 are generally disposed perpendicularly to one another with the imperforate panel 82 being disposed generally vertically in alignment with the finish panel 87. The apertured panel 79 is disposed generally horizontally at the underside of the forward portion of the upper housing portion 15.

Considering now the LCD panel assembly 18 in greater detail with reference to FIGS. 9, 10 and 11, the optical system for the projector 10 is more fully and completely described in the foregoing mentioned co-pending lens patent application. The assembly 18 generally includes an LCD panel subassembly 92 having a fresnel lens 95 disposed generally parallel and spaced apart therefrom. When the fresnel lens 95 is disposed in its use position as indicated in FIG. 5, the fresnel lens 95 is generally vertical in its position. However, the lens 95 is mounted in a pivotal manner so that it can be pivotally moved to an inclined position relative to the face of the LCD subassembly 92 for keystone correction purposes. Therefore, the inclined position of the lens 95 helps prevent or decrease keystone distortion, thereby providing essentially a distortion free projected image.

As best seen in FIG. 5, the LCD subassembly 92 includes an LCD panel 97 which is connected to suitable electrical circuits (not shown) for causing the panel 97 to create a desired image for projection purposes. A polarizer 99 is disposed in a parallel spaced-apart manner to the rear of the LCD panel. A fresnel lens 93 is disposed in a parallel spaced-apart manner to the rear of the polarizer 99 for collimating the light from the lamp 22 and the condenser lenses 73 and 74 for illuminating the LCD panel 97. An infrared hot mirror 102 is mounted in a parallel spaced-apart manner to the rear of the fresnel lens 93. The entire LCD subassembly 92 is fixedly mounted together to pivot in unison between the storage and deployed positions.

As seen in FIGS. 9 and 10, the front fresnel lens 95 is pivotally mounted at its base within the lower housing portion 14 between a forward pair of aligned pivot points, such as the pivot point 103. Similarly, the LCD subassembly 92 is pivotally mounted at its base at the bottom of the lower housing portion 14 between a rear pair of aligned pivot points, such as the pivot point 104 disposed to the rear of the pivot point 103. As best seen in FIGS. 9 and 11, a pair of bias torsion springs, such as the bias torsion spring 105, is adapted to urge the front fresnel lens 95 and the LCD subassembly 92, to which it is fixedly connected by a pair of bars or links, such as the bar 101, into their generally vertical upright position. On the other hand, to dispose the housing 12 into its closed or stowed position, the cam 65 forces the cam follower 66, fixed to the front fresnel lens 95, and the LCD subassembly 92 into a rearwardly inclined position. The cam follower 66 acts against the force of the torsion springs, such as the spring 105 and causes them to store energy for biasing purposes. For moving back into the opened position, the upper housing portion 15 swings upwardly and forwardly, the cam 65 moves with the upper housing portion and the cam follower 66 is urged by the springs, such as the spring 105 to follow the surfaces of the cam 65 thereby permitting the LCD assembly 18 to pivot about the pivot points 103 and 104 into its upright position, as shown in FIG. 11.

As best seen in FIG. 5, in order to cool the LCD subassembly 92, two blowers as indicated at 106 are mounted within the interior of the housing 12 at the front portion thereof and directs air received from the apertured front panel 79 and directs it rearwardly through a funnel passage 107 and into a corner passage 108 along a generally horizontal path at the bottom floor of the lower housing portion 14. The air is directed from there vertically upwardly along an LCD passage 109 when the housing 12 is disposed in its use or deployed position, as indicated in FIG. 5. At the upper portion of the LCD subassembly 92, there is disposed an LCD deflector 110 to direct the air flow from the upper portion of the LCD subassembly 92 horizontally rearwardly to exit from the housing 12 via outlets (not shown) for venting purposes. In this manner, the LCD panel 97 in the interior of the housing 12 is cooled.

Considering now the removable lamp assembly 20 and its associated circuit 75 in greater detail with particular reference to FIGS. 3, 4 and 5, there is shown a cup-shaped housing 111 for the removable lamp assembly 20 for holding the lamps 22 and 24. A pair of finger openings 113 and 115 within the bottom portion of the lamp housing 111 positioned within a bottom wall 116 of the housing 12 enables the user to grasp the housing 20 to pull it out of the housing 12 to inspect the lamps to determine if the active lamp is no longer operative. In this manner, the user can then readily rotate the cup-shaped housing 111 through 180° and then reinsert it into the bottom wall 116 of the housing 12, so that the spare lamp 24 then becomes active. The advantages of this novel lamp-changing design is to quickly and definitely know if a lamp is inoperative, since the lamps can be readily removed from the housing for inspection by the user. Also, the user can quickly replace the inoperative lamp, or rotate to the spare lamp to minimize disruptions in the presentation.

As best seen in FIG. 16, the detection circuit includes a spare lamp detector 117 and an active lamp detector 119 for monitoring the current flow to the respective lamps 22 and 24. A logic circuit 122 responds to the outputs of the detectors 117 and 119 so that when current fails to flow through both of the lamps 22 and 24, a signal is generated by the logic circuit 122 to control a pair of switch 126 for the lamp 22. In this regard, when both of the lamps are either malfunctioning, or the lamp housing 20 is removed from the housing 12, the switch 126 is opened under the control of the logic circuit 122. A pair of jacks 128 and 131 for the spare lamp 24 and a pair of jacks 133 and 135 for the active lamp 22 connect the lamps 22 and 24 to a source of power when the lamp housing 20 is disposed within the housing 12. When the lamp housing 20 is withdrawn from the projector housing 12, the lamps 22 and 24 are electrically disconnected from the power by means of the two pairs of jacks 133 and 135. However, the logic circuit 122 causes the jacks 133 and 135 to be de-energized for safety purposes, until the lamp housing 111 is reinserted and a properly functioning lamp 22 or 24 is connected in circuit with the jacks 133 and 135. In this manner, the logic circuit 122 determines that the detector 119 has a complete circuit. At this point, the logic circuit 122 reactivates the power to the lamp assembly 20 for activating the lamp 22 or 24 connected to the jacks 133 and 135.

Considering now the projection lens arrangement 26 in greater detail, the lens arrangement 26 is more fully and completely described in connection with the foregoing mentioned patent application. The projection lens arrangement 26 is pivotally mounted at 29 to swing between a depending position when the housing 12 is in its stowed position and a horizontal forwardly directed position when the housing 12 is disposed in its deployed position. A latch or hard stop indicated generally at 140 retains releasably the lens arrangement 26 in its horizontal or forward disposition, until the user grasps the door arrangement 28 and moves it pivotally inwardly toward its downwardly depending storage position when the housing 12 is returned to its storage position. In this manner, the overall effective length of the projector 10 when it is disposed in its use position, is effectively greater in length to accommodate the optics system of the projector 10. As a result of the greater effective length, the projected image possesses little or no distortion.

Considering now the linkage mechanism 33 in greater detail, the mechanism 33 includes a pair of longitudinally extending right and left rack mounting 142 and 144 which are pivotally connected to opposite sides of the housing 12 in the interior thereof. The rack mounting 142 and 144 cooperate with the respective right and left racks 50 and 51, which move relative to their respective mount when the housing is deployed or moved to its stowed position.

A pair of right and left longitudinally extending link mounts 146 and 148 are fixedly connected to the opposite sides of the lower housing portion 14 and at the lower ends 154 and 155 of each one of the four links pivotally connected thereto. The pinion segments of the upper ends of the links mesh with the teeth of the pair of racks 50 and 55.

As shown in FIGS. 7 and 8, a pair of right and left upstanding stops 151 and 153 are disposed in a generally vertical disposition at the forward ends of the respective right and left link mounts 146 and 148 to limit the upward pivotal movement of the respective links 37 and 41 to a generally vertical disposition as indicated in FIG. 8.

The links 35 and 37 are connected pivotally at their lower ends 154 and 155, respectively, to the right link mount 146. Similarly, the links 39 and 41 are connected pivotally at their lower ends at 156 and 158, respectively, to the left link mount 148.

In order to cause the compressed one of the stow or deploy springs to provide energy for relative movement of the racks 50 and 51, relative to their respective rack mounts 142 and 144, they each have a pair of spring retainers, such as the spring retainer 157 and 159 projecting laterally from the left rack mount 144 and into a pair of spring rack compartments 162 and 164 for the respective deploy spring 60 and the stow spring 62. In this regard, when the release buttons, such as release button 17, is pushed downwardly to free the rack 51 from the rack mount 144, the compressed deploy spring 60 expands within the compartment 162 against its spring retainer 157 of the left rack mount 144 to urge the rack 51 to move laterally with the help of the user, to the fully raised or deployed position as shown in FIG. 8, where the deploy spring 60 is then fully released. In this regard, the rack 51 is disposed in its forwardmost position as indicated in FIG. 8, to permit the deploy spring 60 to be in its released position. In so doing, the stow spring 62 becomes compressed between the spring retainer 159 and the inside of the spring rack compartment 164 as indicated in FIG. 8. In this manner, the operation can then be reversed to move the rack leftwardly or rearwardly when the release button 17 is released to cause, with the assistance of the user, the movement of the upper housing portion 15 rearwardly and downwardly into its closed or stowed position, as indicated in FIG. 7. In so doing, the stow spring 62 moves from its compressed position as shown in FIG. 8, and into a released position when the mechanism 33 is disposed in the position as indicated in FIG. 7.

As best seen in FIGS. 3, 4, 5 and 8, a right rear idler gear 160 meshes with the gear 54 of the latch 50 above and opposite to the pinion gear segment 43 and the link 35 for stabilizing the horizontal translational movement of the rack 50. Similarly, a right front idler gear 161 meshes with the teeth 52 of the rack 50 above and opposite to the gear segment 45 of the link 37. As best seen in FIGS. 7 and 8, a left rear idler gear 163 meshes with the teeth 58 of the rack 51 opposite to the pinion gear segment 47 of the link 39. Similarly, a left front idler gear 165 meshes with the teeth 56 at the front end of the rack 51 above and opposite the gear segment 49 of the link 41. It should be noted that the stabilizer bar or rod 145 extends between the idler gears 160 and 163.

Figure 15:
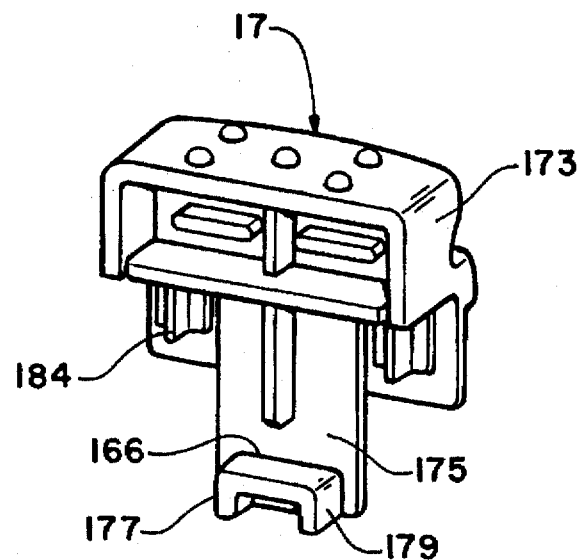
FIG. 15 is an enlarged pictorial of the release button assembly of FIG. 14, illustrating the cam portion thereof.

Considering now the release buttons, such as the release button 17 in greater detail with reference to FIGS. 8, 14 and 15, the release button 17 is generally similar to the release button 16, and includes a cam device 166 which cooperates with a stop projection 168 disposed within an elongated recess 171 of the rack 51 to prevent the springs 60 or 62 from moving the rack 51 relative to its rack mount 144 by interfering with the movement of the rack 51. When the release button 17 is depressed, the cam device 166 moves downwardly beyond the stop projection 168 to permit the spring 62 to urge the rack 51 relative to its rack mount 144 as hereinafter described in greater detail.

A finger engageable button member 173 of the release button 17 has a depending flange 175, which supports the cam device 166 fixed at its lower end portion. As best seen in FIG. 15, the cam device 166 is generally U-shaped, and has a rear facing upright cam surface 177 and a front facing upright cam surface 179 for abutting one side or the other of the stop projection 168. It should be noted that the cam surfaces 177 and 179 are slightly inclined at about 5° and mate with complementary surfaces 180 (FIG. 14) by the front facing cam surface 179 of the cam device 166.

IN OPERATION

In operation, in the position as illustrated in FIG. 14, the mechanism 33 is disposed at its deployed or opened position as indicated in FIG. 8, with the stow spring 62 compressed. When it is desired to close the housing 12, the release buttons, such as the release button 17, is depressed to free the stop projection 168 to permit the rack 51 to be urged resiliently rearwardly (rightwardly in FIG. 14) until the rack translates horizontally rearwardly into its downward position as indicated in FIG. 7. In so doing, the deploy spring 16 becomes compressed and the release button 17 is released to permit it to move its cam device 166 into a locking relationship with the stop projection 168 (on the opposite side of the stop projection 168 as shown in FIG. 14). In this regard, in the stowed position, the stop projection 168 is disposed to the rear of the cam device 168 (to the right of the cam device in FIG. 14) with the projection surface 180 of the stop projection 168 abutting the rear facing upright cam surface 177 of the cammed device 166 to prevent the deployed spring 60 from urging the rack 51 forwardly (leftwardly in FIG. 14).

The release button 17 includes a pair of return springs, such as the return spring 182 (FIG. 14), which extends between a spring retainer 184 and the rack mount 144 to enable the button 17 to be returned to its upper latching position after it is depressed by the user.

Considering now the foot 71 in more detail, with reference to FIGS. 12 and 13 of the drawings, the foot 71 includes an outer telescoping member 186, which is generally rectangular in configuration and has an inner telescoping member 187 which is enacted to slide extensively therefrom or retract therewithin for length adjustment purposes. A boss 188 on the inner telescoping member 187 rides within an elongated slot 189 extending longitudinally in the outer telescoping member 186 to stabilize the back and forth movement of the inner and outer telescoping members 186 and 187.

The outer telescoping member 186 is pivotally connected at one of its end edges by means of a pivot pin 191 within a generally U-shaped yoke or stop 193 on the bottom wall 160 of the housing 12. Thus, the 71 can swing between its horizontal storage position to a depending position to raise the front end portion of the projector housing 12, as indicated in FIG. 13.

The inner telescoping member 186 includes a pair of spring fingers 194 and 196 which have respective finger engagable ears 195 and 197 which fit within a pair of elongated side slots, such as the side slot 206 which receives the ear 195 extending therefrom. The spring fingers include a set of detents 202 and 204 to enable the user to grasp the ears 195 and 197 and press them inwardly to free the detents 202 and 204 on the respective fingers 194 and 196 to enable the inner telescoping member and the outer telescoping member to move extensively adjustably relative to one another. The ears can then be released to permit the fingers to snap outwardly relative to one another to engage another detent position.

The downward position of the foot 71 can be adjusted relative to the yoke 193 by detents (not shown) to enable the foot 71 to assume different positions as indicated in FIG. 13. As best seen in FIG. 12, an elastomeric pad 208 covers the terminal end edge of the inner telescoping member 187 to enable the foot 71 to frictionally engage the supporting surface for the projector 10. As best seen in FIG. 6, a set of four fixed foot members 210, 213, 215 and 217 are disposed at the four corners of the bottom wall 116 to enable the projector 10 to be mounted in a generally horizontal disposition on a supporting surface. By swinging the movable foot 71 into its dependent position, the overall length of the foot 71 is greater than the height of the four fixed foot members and is positioned intermediate into front fixed foot members 210 and 213 to thereby raise the front portion of the projector to enable the image to be projected at a greater height onto the viewing surface.

Figure 18:
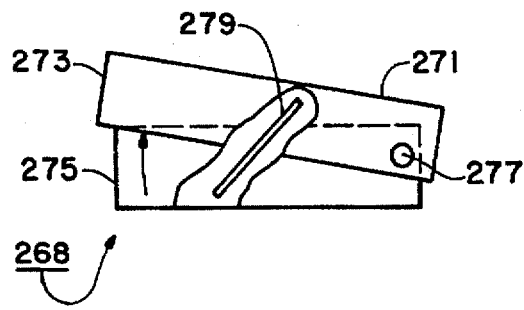
FIG. 18 is a diagrammatic view of the projector of FIG. 17, illustrating it in its use position.
Figure 17:
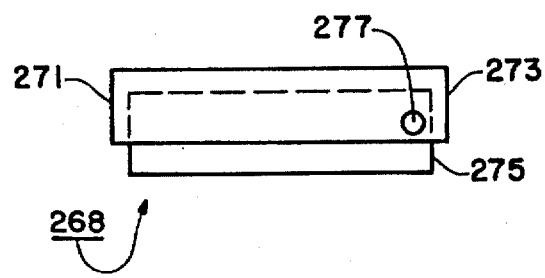
FIG. 17 is a diagrammatic view of a projector, which is constructed in accordance with the present invention.

Referring now to FIGS. 17 and 18, there is shown a projector 268, which is similar to the projector 10 of FIG. 1, except that the projector 268 includes a housing 271 having a pair of upper and lower housing portions 273 and 275 which swing in a pivotal manner into an adjustable position similar to a clam shell operation. The upper and lower housing portions 273 and 275 are pivotally connected together at 277 at one corner portion thereof to move between a closed storage position as indicated in FIG. 17 and an opened use position as indicated in FIG. 18. In its use position as indicated in FIG. 18, a display panel assembly 279 is disposed in a rearwardly angular disposition to project the image formed thereon in an upward and forward direction.

Figure 19:
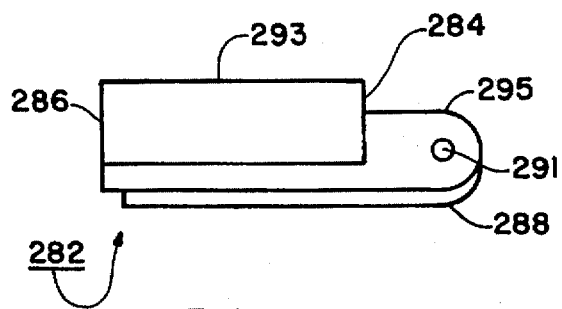
FIG. 19 is another projector, which is constructed in accordance with the present invention.
Figure 20:
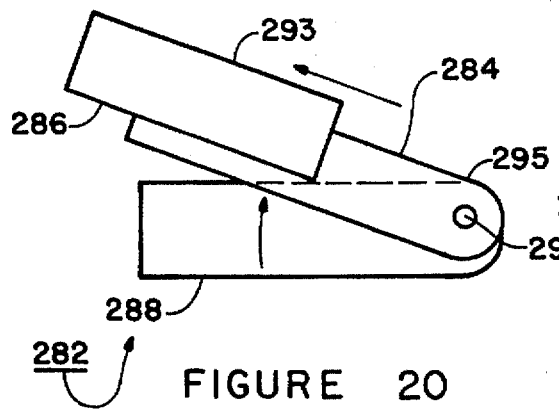
FIG. 20 is a diagrammatic view of the projector of FIG. 19 illustrating it in its use position.

Referring now to FIGS. 19 and 20, there is shown a projector 282, which is constructed in accordance with the present invention and which is similar to the projector 10, except that the projector 282 includes a housing 284 having upper and lower housing portions 286 and 288 pivotally connected together at a corner portion as indicated at 291 to produce a relative angular and translational movement between a storage position (FIG. 19) and a use position (FIG. 20). In this regard, the upper housing portion 286 includes an outer or forward housing part 293 slidably movably connected to an inner pivotal housing part 295.

In use, the upper housing portion 286 swings pivotally upwardly angularly relative to the lower housing portion 288. The forward outer housing part 293 then moves translationally forwardly relative to the pivotal housing part 295 into the position as indicated in FIG. 20.

Figure 21:
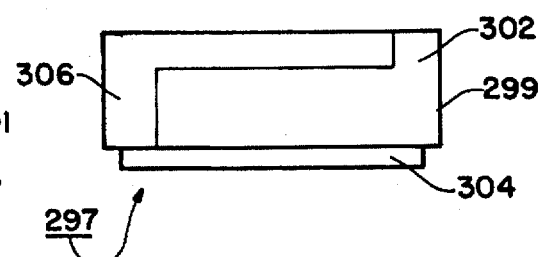
FIG. 21 is still another projector, which is constructed in accordance with the present invention.
Figure 22:
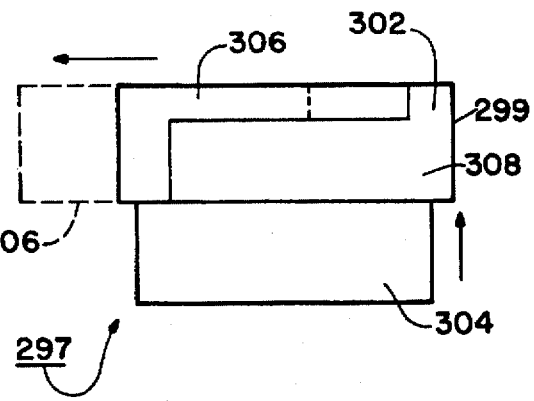
FIG. 22 is a diagrammatic view of the projector of FIG. 21 illustrating it in its use position.

Referring now to FIGS. 21 and 22, a projector 297, which is similar to the projector 10 of FIG. 1, and which is constructed in accordance with the present invention. The projector 297 differs from the projector 10 in that the projector 297 includes a housing 299 having a pair of upper and lower housing portions 302 and 304 which initially move to an elevated position through a vertical motion relative to one another, and then the upper housing portion 302 moves translationally forwardly relative to the lower housing portion 304. In this regard, the upper housing portion 302 includes a front housing part 306 which is movably mounted relative to a rear housing part 308.

In operation, the upper housing portion 302 is moved upwardly vertically relative to the lower housing portion 304. Thereafter, the front housing part 306 is moved forwardly in a translational manner relative to the rear housing part 308 into the adjusted use position as indicated in FIG. 22.

Figure 23:
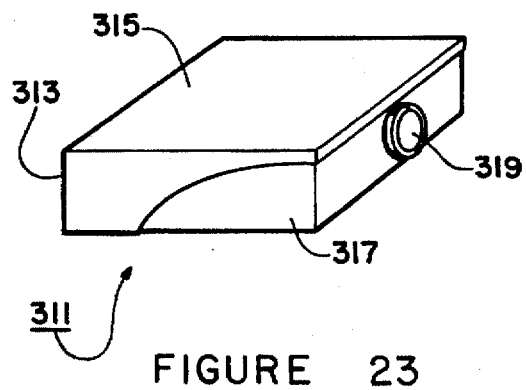
FIG. 23 is still a further projector, which is constructed in accordance with the present invention.
Figure 24:
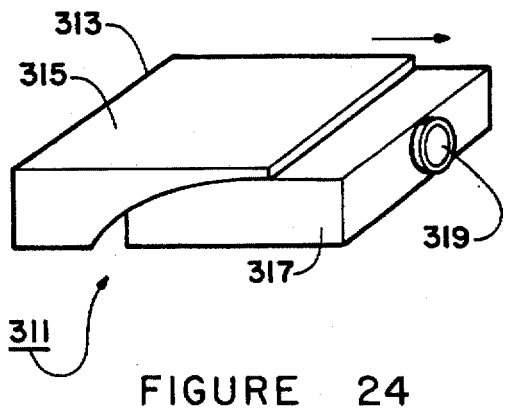
FIG. 24 is a diagrammatic view of the projector of FIG. 23 illustrating it in its use position.

Considering now a projector 311 shown in FIGS. 23 and 24, the projector 311 is constructed in accordance with the present invention and is generally similar to the projector 10 of FIG. 1. The projector 311 includes a housing 313 having an upper portion 315 and a lower portion 317. The lower portion 317 has a projection lens 319 mounted on the forward portion thereof. The lower portion 317 is mounted translationally movably relative to the upper portion 315.

In use, the lower portion 317 is moved translationally forwardly relative to the upper portion 315 into its adjusted position as indicated in FIG. 24.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A display panel projector, comprising:

a housing having a pair of housing portions mounted relative to each other;

a mechanism mounted within the housing to enable one housing portion to be moved relative to the other housing portion to cause the overall dimensions to be increased effectively when the housing portions are moved relative to one another into their use position;

a display panel assembly mounted within the housing for creating a displayable image;

illumination means mounted within the housing for illuminating the display panel assembly;

a projection lens arrangement is mounted at one end of said housing for facilitating the projection of the image created by the display panel assembly, said illumination means and said projection lens arrangement being aligned along an optical path extending within the increased overall dimensions of said housing to provide a desirable projected image; and wherein said mechanism causes said housing portions to move transversely relative to one another to increase the overall length of the housing.

2. A display panel projector according to claim 1, wherein said mechanism causes said housing portions to move apart vertically relative to one another to increase the overall height off the housing to accommodate said display panel assembly in a vertical disposition in its use position.

3. A display panel projector according to claim 2, further including means responsive to said mechanism for mounting said display panel assembly in an inclined position within the housing when it is disposed in its storage position and for causing the display panel assembly to move into an upright position within the optical path to enable the images formed on the display panel assembly to be projected from the projection lens arrangement.

4. A display panel projector according to claim 3, wherein said means for causing the display panel assembly to move includes means for mounting the display panel assembly in a pivotal manner, and spring means for urging it resiliently into its upright position.

5. A display panel projector according to claim 3, further including a front projection lens arrangement opening to permit the arrangement to extend therethrough in its horizontal use position, and door means disposed in a generally vertical position when the housing is disposed in its storage position and movable to a generally horizontal position when the housing is disposed in its use position.

6. A display panel projector, comprising:

a housing having a pair of housing portions mounted relative to each other;

a mechanism mounted within the housing to enable one housing portion to be moved relative to the other housing portion to cause the overall dimensions to be increased effectively when the housing portions are moved relative to one another into their use position;

a display panel assembly mounted within the housing for creating a displayable image, wherein said display panel assembly is responsive to the relative movement of said housing portions to move between a use position and a storage position;

illumination means mounted within the housing for illuminating the display panel assembly; and a projection lens arrangement is mounted at one end of said housing for facilitating the projection of the image created by the display panel assembly, said illumination means and said projection lens arrangement being aligned along an optical path extending within the increased overall dimensions of said housing to provide a desirable projected image.

7. A display panel projector according to claim 1, further including a foot member pivotally connected to the underside of said housing at the front portion thereof for moving between a generally horizontal storage position and a depending position for elevating the front portion of the housing.

8. A display panel projector according to claim 1, wherein said housing portions are pivotally connected together at one end thereof for angular positional adjustment relative to one another.

9. A display panel projector, comprising:

a housing having a pair of housing portions mounted relative to each other;

a mechanism mounted within the housing to enable one housing portion to be moved relative to the other housing portion to cause the overall dimensions to be increased effectively when the housing portions are moved relative to one another into their use position;

a display panel assembly mounted within the housing for creating a displayable image;

illumination means mounted within the housing for illuminating the display panel assembly;

a projection lens arrangement is mounted at one end of said housing for facilitating the projection of the image created by the display panel assembly, said illumination means and said projection lens arrangement being aligned along an optical path extending within the increased overall dimensions of said housing to provide a desirable projected image; and wherein said mechanism includes a four bar linkage for enabling the upper housing portion to swing upwardly and forwardly into the use position.

10. A display panel projector, comprising:

a housing having a pair of housing portions mounted relative to each other;

a mechanism mounted within the housing to enable one housing portion to be moved relative to the other housing portion to cause the overall dimensions to be increased effectively when the housing portions are moved relative to one another into their use position;

a display panel assembly mounted within the housing for creating a displayable image;

illumination means mounted within the housing for illuminating the display panel assembly;

a projection lens arrangement is mounted at one end of said housing for facilitating the projection of the image created by the display panel assembly, said illumination means and said projection lens arrangement being aligned along an optical path extending within the increased overall dimensions of said housing to provide a desirable projected image; and further including means for mounting said projection lens arrangement in a pivotal manner to permit the arrangement to be moved between a generally vertical storage position within the housing and a generally horizontal use position projecting outwardly from the front portion of said housing in its use position.

11. A display panel projector, comprising:

a housing having a pair of housing portions mounted relative to each other;

a mechanism mounted within the housing to enable one housing portion to be moved relative to the other housing portion to cause the overall dimensions to be increased effectively when the housing portions are moved relative to one another into their use position;

a display panel assembly mounted within the housing for creating a displayable image;

illumination means mounted within the housing for illuminating the display panel assembly;

a projection lens arrangement is mounted at one end of said housing for facilitating the projection of the image created by the display panel assembly, said illumination means and said projection lens arrangement being aligned along an optical path extending within the increased overall dimensions of said housing to provide a desirable projected image;

further including a foot member pivotally connected to the underside of said housing at the front portion thereof for moving between a generally horizontal storage position and a depending position for elevating the front portion of the housing; and wherein said foot includes a pair of telescoping members to enable the length of the foot to be adjusted to raise the front end of the housing by an adjustable distance.

12. A display panel projector, comprising:
   a housing having a pair of housing portions mounted relative to each other;
   a mechanism mounted within the housing to enable one housing portion to be moved relative to the other housing portion to cause the overall dimensions to be increased effectively when the housing portions are moved relative to one another into their use position;
   a display panel assembly mounted within the housing for creating a displayable image;
   illumination means mounted within the housing for illuminating the display panel assembly;
   a projection lens arrangement is mounted at one end of said housing for facilitating the projection of the image created by the display panel assembly, said illumination means and said projection lens arrangement being aligned along an optical path extending within the increased overall dimensions of said housing to provide a desirable projected image; and
   further including a pair of front panels hingedly connected together for folding into a generally overlapping configuration within the interior of said housing and for alternatively assuming a generally right angle configuration when the housing is moved to its use position.

13. A display panel projector according to claim 12, wherein one of said front panels is apertured to facilitate air flow for cooling purposes.

14. A display panel projector according to claim 13, wherein said hingedly connected front panels are composed of plastic material and are joined together via a living hinge.

15. A display panel projector, comprising:
   a housing having a pair of housing portions mounted relative to each other;
   a mechanism mounted within the housing to enable one housing portion to be moved relative to the other housing portion to cause the overall dimensions to be increased effectively when the housing portions are moved relative to one another into their use position;
   a display panel assembly mounted within the housing for creating a displayable image;
   illumination means mounted within the housing for illuminating the display panel assembly;
   a projection lens arrangement is mounted at one end of said housing for facilitating the projection of the image created by the display panel assembly, said illumination means and said projection lens arrangement being aligned along an optical path extending within the increased overall dimensions of said housing to provide a desirable projected image; and
   wherein said light means includes a pair of lamps, a removable lamp housing for fitting into an opening in the projector housing, the lamps being equally spaced apart and symmetrically mounted within the lamp housing so that when one of the lamps malfunctions, the lamp housing can be removed and rotated through 180° and then replaced in the projector housing so that the other lamp may then be activated.

16. A display panel projector according to claim 15 further including detection means for determining that the lamp housing has been removed from the projector housing to discontinue the application of power to the lamp jacks during the removal of the lamp housing from the projector housing.

17. A display panel projector, comprising:
   a housing having a pair of housing portions mounted relative to each other;
   a mechanism mounted within the housing to enable one housing portion to be moved relative to the other housing portion to cause the overall dimensions to be increased effectively when the housing portions are moved relative to one another into their use position;
   a display panel assembly mounted within the housing for creating a displayable image;
   illumination means mounted within the housing for illuminating the display panel assembly;
   a projection lens arrangement is mounted at one end of said housing for facilitating the projection of the image created by the display panel assembly, said illumination means and said projection lens arrangement being aligned along an optical path extending within the increased overall dimensions of said housing to provide a desirable projected image;
   wherein said housing portions are pivotally connected together at one end thereof for angular positional adjustment relative to one another; and
   wherein an upper one of said housing portions includes a pair of housing parts translationally mounted relative to one another so that when said upper one of said housing portions is disposed in an angular adjusted position relative to a lower one of the housing portions, said housing parts of said upper housing portion can be moved into an adjusted translated position to increase the overall length of said upper housing portion.

18. A display panel projector, comprising:
   a housing having a pair of housing portions mounted relative to each other;
   a mechanism mounted within the housing to enable one housing portion to be moved relative to the other housing portion to cause the overall dimensions to be increased effectively when the housing portions are moved relative to one another into their use position;
   a display panel assembly mounted within the housing for creating a displayable image;
   illumination means mounted within the housing for illuminating the display panel assembly;
   a projection lens arrangement is mounted at one end of said housing for facilitating the projection of the image created by the display panel assembly, said illumination means and said projection lens arrangement being aligned along an optical path extending within the increased overall dimensions of said housing to provide a desirable projected image; and
   wherein an upper one of said housing portions is mounted to be moved upwardly relative to a lower one of said housing portions into an adjusted elevated position to accommodate said display panel assembly.

19. A display panel projector according to claim 1, wherein said upper housing portion includes a pair of housing parts translationally mounted relative to one another so that when said upper housing portion is disposed in said elevated position, said housing parts can be translated into an adjusted position to enable the overall length of said upper housing portion to be increased.

20. A display panel projector, comprising:
   a housing having a pair of housing portions mounted relative to each other;
   a mechanism mounted within the housing to enable one housing portion to be moved relative to the other housing portion to cause the overall dimensions to be increased effectively when the housing portions are moved relative to one another into their use position;

a display panel assembly mounted within the housing for creating a displayable image;

illumination means mounted within the housing for illuminating the display panel assembly;

a projection lens arrangement is mounted at one end of said housing for facilitating the projection of the image created by the display panel assembly, said illumination means and said projection lens arrangement being aligned along an optical path extending within the increased overall dimensions of said housing to provide a desirable projected image; and wherein said housing portions are mounted to move translationally relative to one another to increase the overall length of said housing.

21. A method of using a display panel projector, comprising:

using a projector having a housing including a pair of housing portions confining a display panel assembly and optical means therefor to cause an image displayed by the assembly to be projected;

moving a housing portion transversely relative to the other portion to adjust the overall dimensions of the projector to accommodate said optical means in such a manner as to reduce or eliminate distortion of the image; and projecting an image formed by the display panel assembly via said optical means.

22. A display panel projector, comprising:

a housing having a pair of housing portions mounted relative to each other;

a mechanism mounted within the housing to enable one housing portion to be moved relative to the other housing portion to cause the overall dimensions to be increased effectively when the housing portions are moved relative to one another into their use position;

a display panel assembly mounted within the housing for creating a displayable image;

illumination means mounted within the housing for illuminating the display panel assembly;

a projection lens arrangement is mounted at one end of said housing for facilitating the projection of the image created by the display panel assembly, said illumination means and said projection lens arrangement being aligned along an optical path extending within the increased overall dimensions of said housing to provide a desirable projected image; and wherein said mechanism causes said housing portions to move apart vertically relative to one another to increase the overall height of the housing to accommodate said display panel assembly in a vertical disposition when said housing portions are moved into their use position.

* * * * *

UNITED STATES PATENT AND TRADEMARK OFFICE
CERTIFICATE OF CORRECTION

PATENT NO : 5,669,688
DATED : September 23, 1997
INVENTOR(S): Baar et al.

It is certified that error appears in the above-identified patent and that said Letters Patent is hereby corrected as shown below:

Column 1, line 27, change "Livid" to read --Liquid--.

Claim 19, line 53, "Claim 1" should read --Claim 18--.

Signed and Sealed this

Third Day of March, 1998

*Attest:*

BRUCE LEHMAN

*Attesting Officer*     *Commissioner of Patents and Trademarks*